United States Patent
Yang et al.

(10) Patent No.: US 11,914,831 B1
(45) Date of Patent: Feb. 27, 2024

(54) SELF-CAPACITOR SENSING FOR CAPACITIVE TOUCH PANELS

(71) Applicant: Shenzhen Goodix Technology Co., Ltd., Shenzhen (CN)

(72) Inventors: Chao Yang, San Diego, CA (US); Dazhi Wei, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/164,605

(22) Filed: Feb. 5, 2023

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ............................. G06F 3/0446; G06F 3/0412
See application file for complete search history.

(56) References Cited

U.S. PATENT DOCUMENTS

| | | | | |
|---|---|---|---|---|
| 8,159,462 B1* | 4/2012 | Seguine | ............... | G06F 3/04182 345/173 |
| 2007/0074913 A1* | 4/2007 | Geaghan | ............... | G06F 3/0445 178/18.06 |
| 2009/0167325 A1* | 7/2009 | Geaghan | ............. | G06F 3/04166 324/660 |
| 2009/0167720 A1* | 7/2009 | Geaghan | ............... | G06F 3/0416 345/174 |
| 2010/0073323 A1* | 3/2010 | Geaghan | ............... | G06F 3/0446 345/174 |
| 2010/0170726 A1* | 7/2010 | Yeh | ...................... | G06F 3/03545 178/19.03 |
| 2010/0245286 A1* | 9/2010 | Parker | ................. | G06F 3/04883 345/174 |
| 2011/0157068 A1* | 6/2011 | Parker | ................... | G06F 3/0446 345/174 |
| 2013/0169340 A1* | 7/2013 | Tao | ......................... | G06F 3/044 324/686 |
| 2015/0002176 A1* | 1/2015 | Kwon | .................. | G06F 3/0445 324/679 |

* cited by examiner

*Primary Examiner* — Dmitriy Bolotin
(74) *Attorney, Agent, or Firm* — Kilpatrick Townsend & Stockton LLP

(57) ABSTRACT

Techniques are described for discrete-time self-capacitor sensing in a touch panel. The self-capacitor manifests a detectably different capacitance based on presence or absence of a local touch event on the touch panel. In a first time phase, embodiments charge a self-capacitor and initialize a ramp bias generator. In a second time phase, embodiments discharge the self-capacitor with a ramp-controlled current source that is biased by the ramp bias generator to produce a discharge current that transitions from high at the beginning of the second time phase to low at the end of the second time phase. By the end of the second phase, the remaining charge in the self-capacitor depends on presence or absence of a local touch event. Some embodiments convert the remaining charge to an amplified sense output for readout.

19 Claims, 8 Drawing Sheets

SELF-CAPACITOR SENSING FOR CAPACITIVE TOUCH PANELS

TECHNICAL FIELD

The present document relates to sensing circuits, and, more particularly, to discrete-time self-capacitor sensing approaches with low jitter sensitivity, such as for use in large capacitive touch panels.

BACKGROUND

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Often, the touch-sensing layers of the display include an array of "mutual capacitors" and "self-capacitors." For example, there is a self-capacitor for each row and for each column of the array, and there is a mutual capacitor at each row-column intersection of the array. The mutual capacitors in the touch panel tend to be the primary sensing elements because they tend to provide more accurate information regarding touch (e.g., finger) locations. Still, self-capacitor sensing can provide a useful alternative (or supplemental) source of touch-sensing information, especially for cases in which mutual-capacitor sensing tends to be inaccurate (e.g., when a user has wet fingers).

However, self-capacitor sensing can be more challenge, due to smaller signal levels than those obtained with mutual capacitor sensing. The change in capacitance induced in a self-capacitor during a touch even may typically be only a small fractional of its base capacitance value. To reliably sense such a small change in capacitance, sensing circuits can be designed to effectively cancel the base capacitance value with sufficiently low read-out noise. While several conventional approaches exist, those approaches tend to have limitations, such as a relatively high sensitivity to clock jitter and/or a relatively large footprint.

BRIEF SUMMARY

Embodiments disclosed herein include systems and methods for discrete-time self-capacitor sensing in a capacitive touch panel, such as integrated into a display of a touchscreen electronic device. The touch panel includes touch sense channels, each coupled with a respective self-capacitor. The self-capacitor manifests a first capacitance in absence of a local touch event and a second capacitance in presence of a local touch event (e.g., the total capacitance at the self-capacitor is higher when a user is touching the touch panel in a location of the self-capacitor). In a first time phase, embodiments charge a self-capacitor and initialize a ramp bias generator. In a second time phase, embodiments discharge the self-capacitor with a ramp-controlled current source that is biased by the ramp bias generator to produce a discharge current that transitions from high at the beginning of the second time phase to low at the end of the second time phase. By the end of the second phase, the remaining charge in the self-capacitor depends on presence or absence of a local touch event. Some embodiments convert the remaining charge to an amplified sense output for readout.

According to a first set of embodiments, a method is provided for self-capacitor sensing in a touch panel. The method includes: charging a self-capacitor of the touch panel for a first time period by coupling the self-capacitor to a source voltage, the self-capacitor having a first capacitance in absence of a local touch event on the touch panel and having a second capacitance in presence of the local touch event on the touch panel, the second capacitance being different from the first capacitance; and discharging the self-capacitor to a discharge level for a second time period subsequent to the first time period by: coupling the self-capacitor to a ramp-controlled current source; and biasing the ramp-controlled current source to generate a discharge current that transitions from a high discharge current at a start of the second time period to a low discharge current at an end of the second time period based on a ramping transition profile, such that the discharge level represents a first amount of remaining charge in absence of the local touch event and a second amount of remaining charge in presence of the local touch event, the first and second amounts of remaining charge being different; outputting a sense signal based on the discharge level for a third time period subsequent to the second time period.

According to another set of embodiments, a system is provided for self-capacitor sensing in a touch panel. The system includes: a touch panel interface to couple with a self-capacitor of a touch panel, the self-capacitor having a first capacitance in absence of a local touch event on the touch panel and having a second capacitance in presence of the local touch event on the touch panel, the second capacitance being different from the first capacitance; a ramp-controlled current source; an amplifier block; and a phased switch controller coupled with a plurality of switches. The phased switch controller is to: control a first one or more switches, for a first time period, to charge the self-capacitor based on a source voltage; and control a second one or more switches, for a second time period subsequent to the first time period, to discharge the self-capacitor to a discharge level by biasing a ramp-controlled current source to generate a discharge current that transitions from a high discharge current at a start of the second time period to a low discharge current at an end of the second time period based on a ramping transition profile, such that the discharge level represents a first amount of remaining charge in absence of the local touch event and a second amount of remaining charge in presence of the local touch event, the first and second amounts of remaining charge being different. Some such embodiments further include an amplifier block, wherein the phased switch controller is further configured to control a third one or more switches, for a third time period subsequent to the second time period, to output a sense signal based on the discharge level.

Some such embodiments of the system for self-capacitor sensing are provided as part of a display system. The display system includes: a display; the touch panel integrated with the display and comprising a plurality of touch sense channels formed by a grid of row lines and column lines, each of the plurality of touch sense channels coupled with a respective one of a plurality of self-capacitors; and a plurality of instances of the system for self-capacitor sensing, each coupled with a respective one of the plurality of self-capacitors.

The drawings, the description and the claims below provide a more detailed description of the above, their implementations, and features of the disclosed technology.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Figure 1:
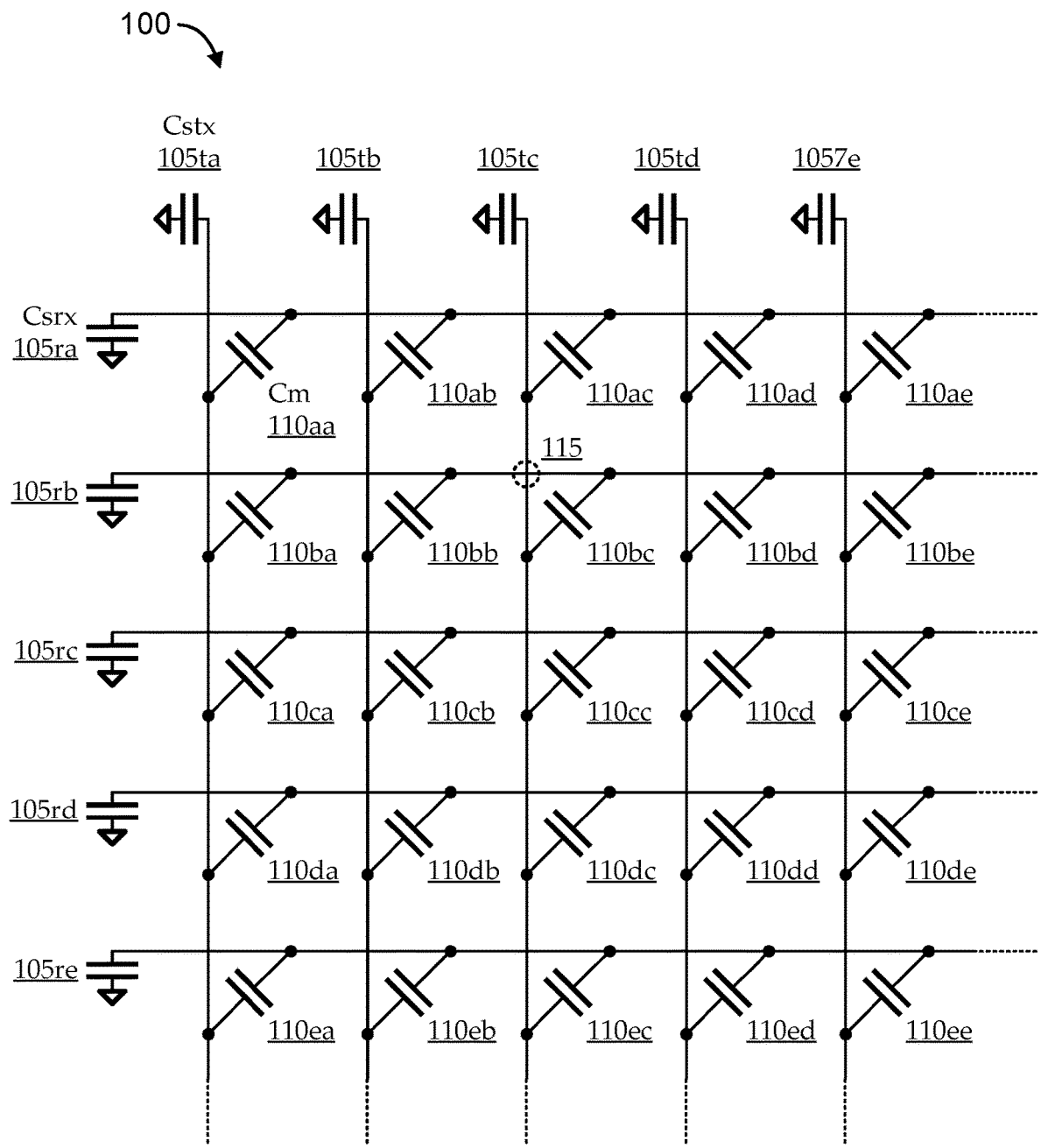
FIG. 1 shows a simplified portion of an illustrative conventional touch panel array having rows and columns.

FIG. 1 shows a simplified portion of an illustrative conventional touch panel array 100 having rows and columns. In general, the touch panel array 100 is configured to sense when and where a user touches the array by sensing a change in capacitance and associating the sensed change to a particular row-column intersection location. A "mutual capacitor" (Cm) 110 (illustrated as 110*aa*-110*ee*) is located at each row-column intersection location. Additionally, each row and each column of the array 100 is coupled with a respective "self-capacitor" (Cs) 105 (illustrated as Csrx 105*ra*-105*re* and Cstx 105*ta*-105*te*). The row-wise self-capacitors are labeled "Csrx", and the column-wise self-capacitors are labeled "Cstx." For example, a touch event occurring (e.g., a finger being placed) at the circled row-column intersection location 115 can cause a detectable change in capacitance relating to mutual capacitor 110*bc*, row-wise self-capacitor 105*rb*, and column-wise self-capacitor 105*tc*.

Although not explicitly shown as such, the touch panel array 100 can be integrated as part of a display, such as a touchscreen display of an electronic device. The grid of row lines and column lines effectively provides a number of touch sense channels. Each of some or all of the touch sense channels is coupled with a respective one of the self-capacitors 105. Techniques are described herein for sensing whether there is presence or absence of a local touch event relative to any particular self-capacitor 105. For example, a local touch event can be a touch event on the touch panel in any location that manifests a detectable change in capacitance of the particular self-capacitor 105.

The mutual capacitors 110 in the touch panel array 100 tend to be the primary sensing elements because they tend to provide more accurate information regarding touch (e.g., finger) locations. Still, self-capacitor 105 sensing can provide a useful alternative (or supplemental) source of touch-sensing information, especially for cases in which mutual-capacitor 110 sensing tends to be inaccurate (e.g., when a user has wet fingers). However, self-capacitor 105 sensing can be more challenge, due to smaller signal levels than those obtained with mutual capacitor 110 sensing. The change in capacitance induced in a self-capacitor 105 during a touch even may typically be only a small fractional of its base capacitance value. For example, there may typically be less than a 0.1-percent difference in measured capacitance between a touch and a non-touch condition. To reliably sense such a small change in capacitance, sensing circuits can be designed to effectively cancel the base capacitance value with sufficiently low read-out noise. While several conventional approaches exist, those approaches tend to have limitations.

Figure 2:
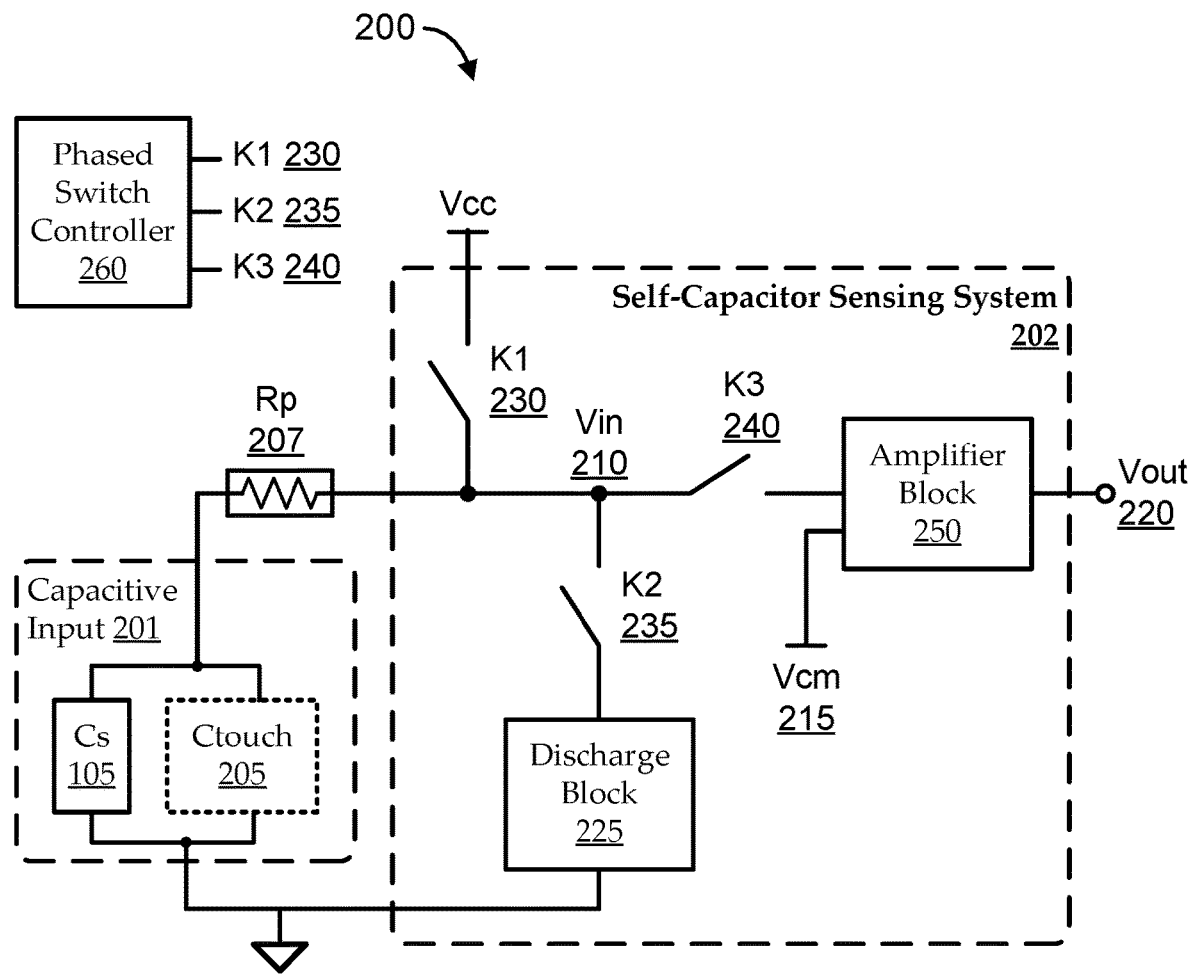
FIG. 2 shows a high-level block diagram of a self-capacitor sensing environment for discrete-time sensing.

FIG. 2 shows a high-level block diagram of a self-capacitor sensing environment 200 for discrete-time sensing. The environment 200 includes a capacitive input 201 and a self-capacitor sensing system 202. The capacitive input 201 represents the total self-capacitance, which changes based on presence or absence of a touch event. This is represented by showing the capacitive input 201 as one of the self-capacitors 105 in parallel with a touch capacitance (Ctouch) 205. When there is no relevant touch event, such as when a user is not touching the touch panel in any location that has a capacitive effect on the self-capacitor 105, there is no additional touch capacitance 205 (i.e., Ctouch=0). The total capacitance of the capacitive input 201 (Ci) when there is no relevant touch event is the capacitance of the self-capacitor 105 (i.e., Ci=Cs). When there is a relevant touch event, such as when a user is touching the touch panel in a location that has a capacitive effect on the self-capacitor 105, the touch event manifests as additional touch capacitance 205 (i.e., Ctouch>0). When there is a relevant touch event, the total capacitance of the capacitive input 201 is the sum of the capacitance of the self-capacitor 105 and the touch capacitance 205 (i.e., Ci=Cs+Ctouch).

Figure 3:
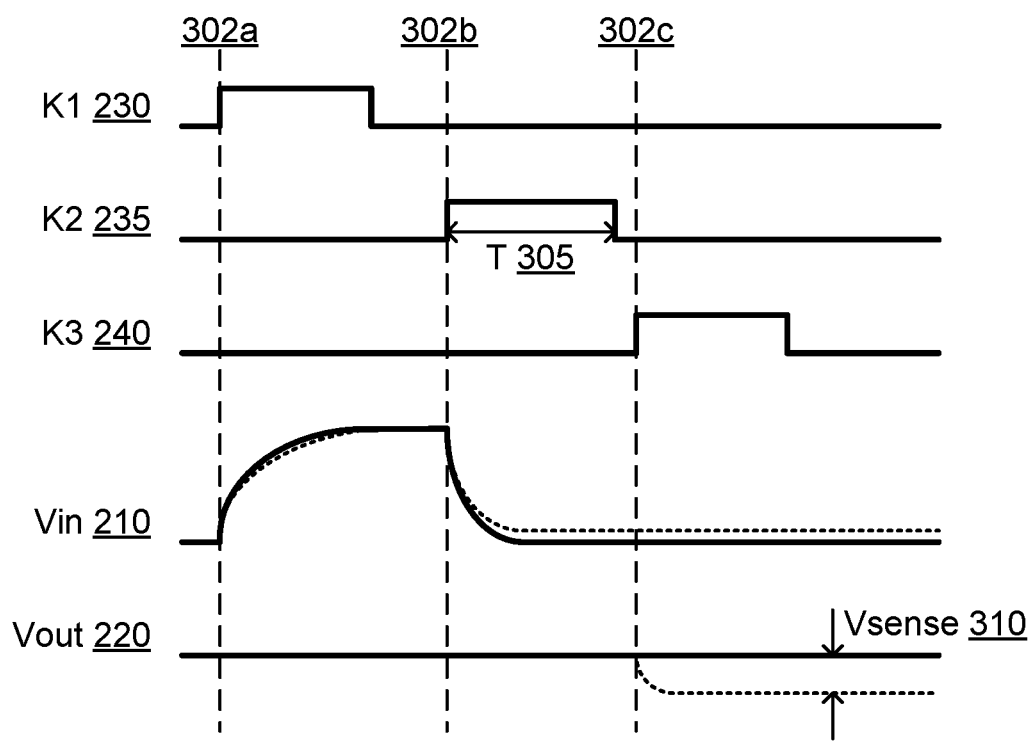
FIG. 3 shows simplified illustrative waveforms and timing at the three phases of operation.

Operation of the self-capacitor sensing system 202 generally follows three phases corresponding to timing of three switches, K1 230, K2 235, and K3 240. For added clarity, FIG. 3 shows simplified illustrative waveforms and timing at the three phases 302 of operation. In a first phase 302a, K1 230 is closed for a charging time. As illustrated in FIG. 2, closing K1 230 couples the capacitive input 201 to a source voltage (Vcc) through a resistor (Rp) 207, thereby charging the capacitive input 201. Essentially, an input voltage node (Vin) 210 is coupled with Vcc, such that the voltage drop between Vin 210 and ground across the capacitive input 201 in series with Rp 207 increases to Vcc in the first phase 302a. After the capacitive input 201 is charged, K1 230 is opened. FIG. 3 shows an illustrative plot of Vin 210 charging up to the fully charged voltage level (e.g., Vcc). A thicker solid line indicates behavior of Vin 210 in absence of a touch event (Ci=Cs), and a thinner dashed line indicates behavior of Vin 210 in presence of a touch event (Ci=Cs+Ctouch).

In a second phase 302b, K2 235 is closed for a predetermined discharge time (T) 305 (both K1 230 and K3 240 are open). As illustrated in FIG. 2, closing K2 235 couples Vin 210 with a discharge block 225. The voltage across the capacitive input 201 and Rp 207 (i.e., corresponding to Vin 210) is discharged for the predetermined amount of time by a discharge current provided by discharge block 225. The components are configured so that a certain amount of charge is removed by the discharge block 225 so that Vin 210 is close to Vcm 215 at the end of the predetermined discharge time (T) when no touch event is present.

The rate of discharge through the discharge block 225 is inversely related to the total capacitance of the capacitive input 201. As such, the difference in capacitance of the capacitive input 201 between presence of a touch event and absence of a touch event yields a difference in discharge rate. The illustrative plot of Vin 210 in FIG. 3 shows this effect; the discharging as manifest at Vin 210 is slower in presence of a touch event than in presence of a non-touch event due to the increased capacitance of the capacitive input 201 coming from the additional Ctouch 205. After the predetermined amount of time 305, when K2 235 is opened, the remaining charge on the capacitive input 201 (and the corresponding level of Vin 210) is detectably different between touch event and non-touch event conditions.

In a third phase 302c, K3 240 is opened (with K1 230 and K2 235 closed). As illustrated in FIG. 2, closing K3 240 couples Vin 210 with an amplifier block 250. The amplifier block 250 is configured to amplify the difference in Vin 210 between touch event and non-touch event conditions, so that the difference can be read out as a reliably detectable difference in output voltage (Vout) 220. An illustrative plot of Vout 220 is shown in FIG. 3, and an illustrative difference in Vout 220 between the touch event and non-touch event conditions is labeled as Vsense 310. For a typical amplifier block 250 having gain (a), Vout 220 can be expressed as:

$$V_{out} = \frac{(V_{CC} - V_{CM})C_{touch}}{C_S + C_{touch}}.$$

In some implementations, the amplifier block 250 compares Vin 210 with a common-mode voltage (Vcm) 215. For example, parameters (e.g., T 305 and/or discharge current, Id) is set so that, in absence of a touch event, Vin 210 decays substantially to Vcm 215 in the second phase 302b; and in presence of a touch event, Vin 210 decays to some level greater than Vcm 215 (Vin>Vcm). For a capacitor, it is known that the capacitor current (Ic) is related to its capacitance and change in voltage over time: Ic=C*(dV/dt). In context of this example implementation, the relationship can be reformulated as: Id*T=(Vcc–Vcm)*Cs. The amplifier block 250 can amplify a difference between Vin 210 and Vcm 215 in the third phase 302c, so that either the generated Vout 220 is substantially zero in absence of a touch event (where Vin Vcm), or the generated Vout 220 is at a non-zero Vsense 310 level in presence of a touch event (where Vin>Vcm).

As illustrated, embodiments can include, or can be in communication with, a phased switch controller 260. The phased switch controller 260 can output control signals to set the state of switches, such as K1 230, K2, 235, and K3 240. For example, the switches can be transistors, and the control signals can be used to turn the transistors ON or OFF. The phased switch controller 260 can include its own timing control (e.g., a clock, counter, etc.), or the phased switch controller 260 can be in communication with additional components that control timing of the signals output by the phased switch controller 260.

As noted above, the discharge block 225 conventionally generates a substantially constant discharge current, or a fixed charge, or discharge through a fixed resistor. Several conventional discharge block 225 implementations are used, each having different features and limitations. Two of those conventional implementations are shown in FIGS. 4 and 5.

Figure 4:
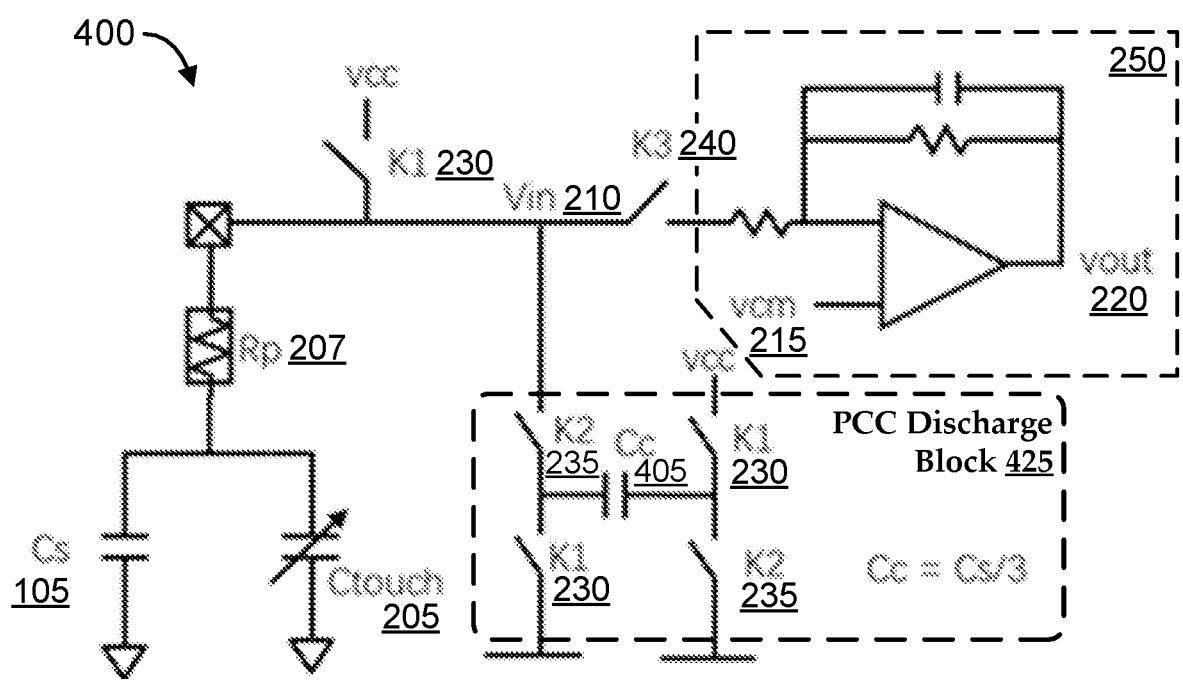
FIG. 4 shows a high-level block diagram of a self-capacitor sensing environment for discrete-time sensing using a conventional pre-charged capacitor (PCC) implementation of the discharge block.
Figure 5:
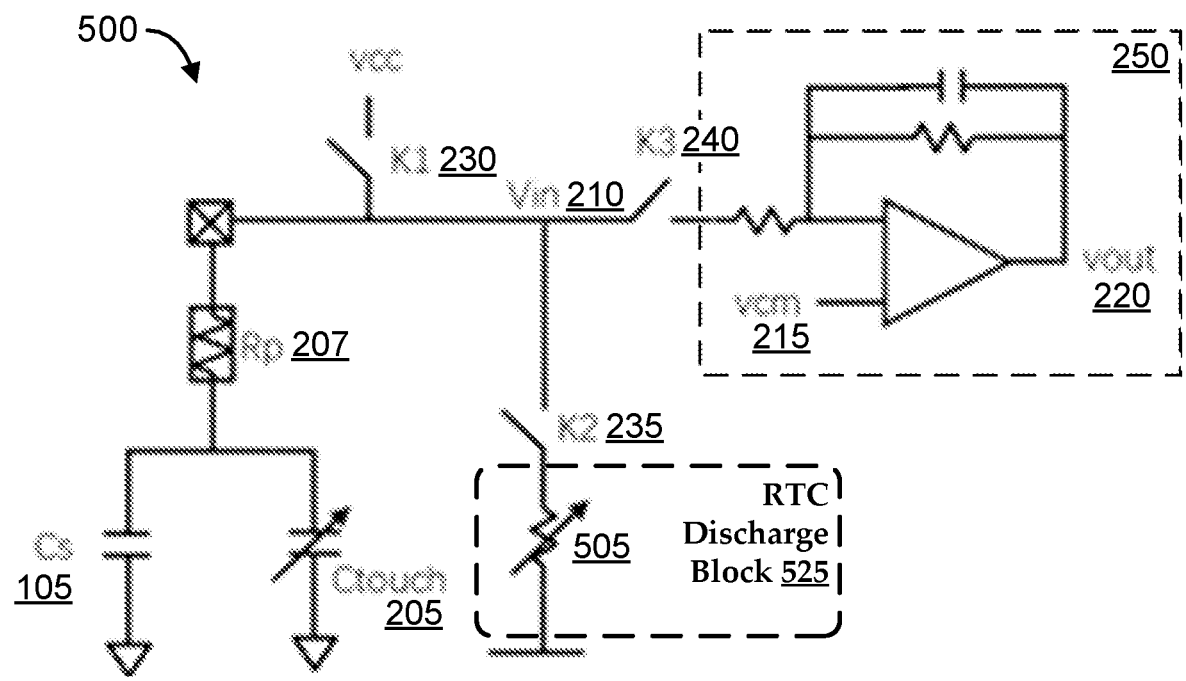
FIG. 5 shows a high-level block diagram of a self-capacitor sensing environment for discrete-time sensing using a conventional resistance-to-time conversion (RTC) implementation of the discharge block.

FIG. 4 shows a high-level block diagram of a self-capacitor sensing environment 400 for discrete-time sensing using a conventional pre-charged capacitor (PCC) implementation of the discharge block 425. As in FIG. 2, the environment 400 includes a capacitive input 201 and a self-capacitor sensing system 202, and the self-capacitor sensing system 202 includes an amplifier block 250 and the conventional PCC discharge block 425. The PCC discharge block 425 includes a charging capacitor (Cc) 405 configured to pre-charge during the first phase 302a and to effectively discharge the capacitive input 201 in the second phase 302b.

As described with reference to FIG. 3, K1 is closed during the first phase 302a. As shown in FIG. 4, closing K1 closes multiple switches. This couples Vin 210 with Vcc (thereby coupling capacitive input 201 with Vcc through Rp 207) and also couples Cc 405 with Vcc 210 (isolated from Vin 210). While the capacitive input 201 is charging with Vcc as in FIG. 2, the PCC discharge block 425 is also pre-charging Cc 405 with Vcc. At the second phase 302b, K2 closes, which decouples Cc 405 from its path to Vcc and couples Cc 405 instead with Vin 210. The capacitance of Cc 405 is substantially less than that of Cs 105, so that coupling Cc 405 with Vin 210 causes Cc 405 to pull charge from the capacitive input 201. As noted above, it can be desirable to configure T 305 and Cc 405 so that the amount of charge pulled away from Cs 105 (Qd) substantially settles Vin 210 to Vcm 215. In general, Qd=Id*T, where Id is the discharge current. For this to work properly, the capacitance of Cc 405 is typically selected to be approximately one-third of the capacitance of Cs 105 (e.g., if the capacitance of Cs 105 is 1 nF, Cc 405 can be approximately 330 pF).

In some applications, implementing the discharge block 225 as the PCC discharge block 425 provides various features, such as low sensitivity to clock jitter (particularly in the second phase 302b) due to full settling of operations in each clock phase 302. However, implementing the PCC discharge block 425 involves providing a Cc 405 for each channel (e.g., each instance of Cs 105 may have a corresponding instance of Cc 405). Particularly where there are tens of channels, or more in a touch panel, the Cc 405 instances can consume a relatively large amount of silicon area, which may be undesirable for many applications.

To avoid the large space penalty associated with the PCC discharge block 425 approach, some conventional implementations use a resistive approach to discharge the capacitive input 201 over a discrete amount of time. FIG. 5 shows a high-level block diagram of a self-capacitor sensing environment 500 for discrete-time sensing using a conventional resistance-to-time conversion (RTC) implementation of the discharge block 525. As in FIG. 2, the environment 500 includes a capacitive input 201 and a self-capacitor sensing system 202, and the self-capacitor sensing system 202 includes an amplifier block 250 and the conventional RTC discharge block 525. The RTC discharge block 525 includes a discharging resistor (Rd) 505 configured to effectively discharge the capacitive input 201 in the second phase 302b. As described with reference to FIG. 3, K1 is closed during the first phase 302a, which couples Vin 210 with Vcc, thereby charging the capacitive input 201 with Vcc via Rp 207. At the second phase 302b, K2 closes (K1 is open), which couples Rd 505 with Vin 210, thereby discharging the capacitive input 201.

As noted above, the RTC discharge block 525 implementation does not rely on multiple instances of large capacitors (instances of Cc 405) and can be appreciably more space efficient, accordingly. However, because current and voltage are inversely proportional in a resistor, the amount of charge being discharged through Rd 505 changes over the second phase 302b along with the change in Vin 210. As such, the discharging provided by the RTC discharge block 525 can produce a very large (e.g., approximately 40-percent) signal loss. Further, the RTC discharge block 525 can be highly sensitive to clock jitter in the second phase 302b. Clock noise can result in slight changes in the width of the pulse used to control the on and off timing of K2 235, which can effectively change T 305. It is known that capacitor current (Ic) is related to its capacitance and a change in voltage over time: $Ic=C^*(dV/dt)$. If there is added pulse-width time due to clock jitter (Tj), for a discharge current (Id), the voltage error induced at Vin 210 from the jitter (Vin_e) can be described as: $Vin\_e=Tj^*Id/(Cs+Ctouch)$.

Embodiments provide a novel approach to discrete-time self-capacitor sensing that uses a ramp generator to generate a ramp-down discharge current. The discharge current is generated to be substantially large at the beginning of each second phase 302b and to be substantially small at the end of each second phase 302b. Embodiments can configure the ramp generator so that the total discharge current over each second phase 302b causes Vin 210 to settle to Vcm 215 in the absence of a touch event. The discharge current toward the beginning of each second phase 302b can be high enough to reduce any noise contribution from the ramp-generated discharge current itself. Further, Vin 210 is relatively high at the beginning of each second phase 302b. As such, a higher voltage drop can be afforded across Rp 207, which supports use of higher discharge current. As noted above, voltage error induced at Vin 210 from clock jitter in the second phase 302b is related to the discharge current (i.e., a higher Id over the same Tj produces a larger Vin_e). The relatively low ramp-generated discharge current toward the end of each second phase 302b reduces the impact of clock jitter on sensed voltage.

Figure 6A:
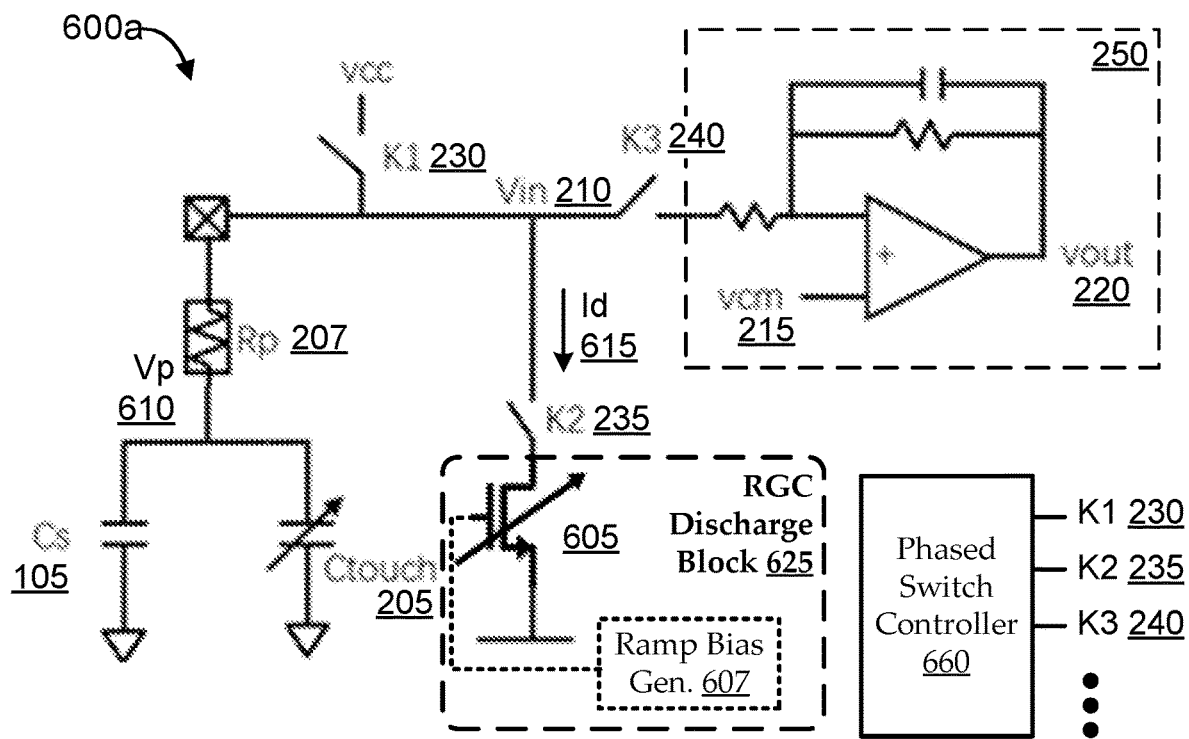
FIG. 6A shows a high-level block diagram of a self-capacitor sensing environment for discrete-time sensing using a ramp-generated current (RGC) discharge block.

FIG. 6A shows a high-level block diagram of a self-capacitor sensing environment 600 for discrete-time sensing using a ramp-generated current (RGC) discharge block 625. As in the environment 200 of FIG. 2, the environment 600 includes a capacitive input 201 having one of the self-capacitors 105 in parallel with a touch capacitance (Ctouch) 205. The environment also includes an implementation of the self-capacitor sensing system 202 that includes an amplifier block 250 and the RGC discharge block 625. The RGC discharge block 625 is illustrated as including a ramp-controlled current source 605 driven by a ramp bias generator 607. In some implementations, an instance of the RGC discharge block 625 includes its own ramp-controlled current source 605 driven by its own ramp bias generator 607. In other implementations, multiple instances of RGC discharge block 625 may share a single ramp bias generator 607 (i.e., a single ramp bias generator 607 can be used to drive one or more instances of the ramp-controlled current source 605 in each of multiple instances of the RGC discharge block 625).

As described with reference to FIG. 2, embodiments can include, or can be in communication with, a phased switch controller 660. The phased switch controller 660 can output control signals to set the states of switches, such as K1 230, K2, 235, K3 240, and possibly others (e.g., switches described with reference to FIGS. 7A and 7B). For example, the switches can be transistors, and the control signals can be used to turn the transistors ON or OFF. The phased switch controller 260 can include its own timing control (e.g., a clock, counter, etc.), or the phased switch controller 260 can be in communication with additional components that control timing of the signals output by the phased switch controller 260. For example, the phased switch controller 660 can turn on switch K1 230 for the first time period based on received trigger signals, based on an internal counter, etc.

Figure 6B:
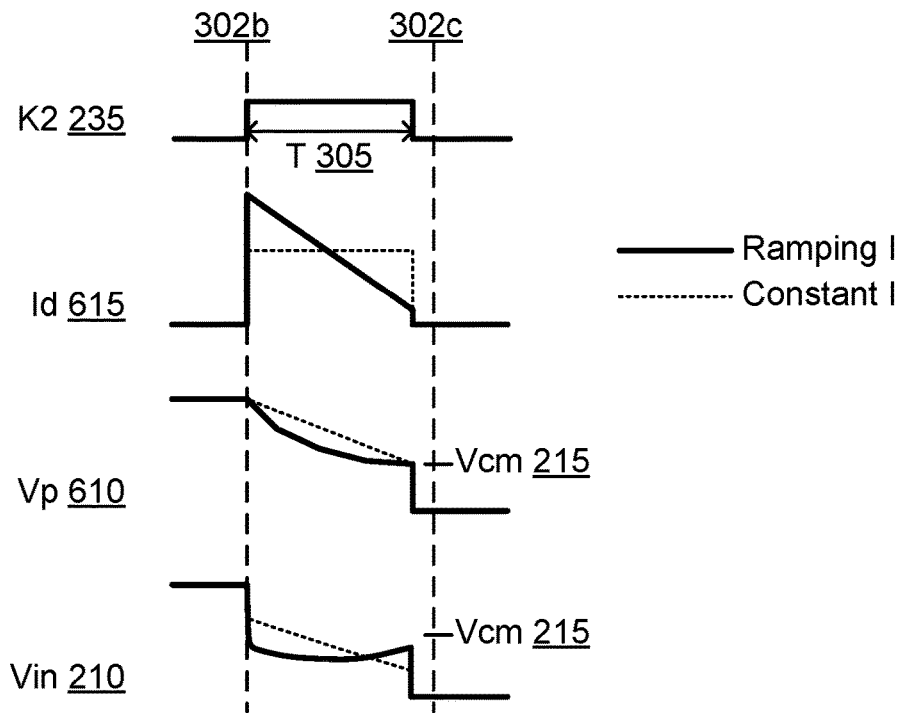
FIG. 6B shows simplified illustrative waveforms and timing for the second phase of operation.

For added clarity, FIG. 6B shows simplified illustrative waveforms and timing for the second phase 302b of operation. As described above, in a first phase 302a, K1 230 is closed, which effectively couples Vin 210 with Vcc for an amount of time, thereby charging the capacitive input 201 and pulling Vin 210 up to Vcc. Because capacitive input 201 and Rp 207 are coupled in series between Vin 210 and ground, the voltage drop across the capacitive input 201 (Vp 610) is a first portion of Vin 210, and the voltage drop across Rp 207 through the capacitive input 201 and Rp 207 is a remaining portion of Vin 210 (i.e., the voltage drop across Rp 207 is Vin–Vp).

At the start of the second phase 302b, K2 is turned on (e.g., closed), which couples the ramp-controlled current source 605 with Vin 210. As illustrated, the discharge current (Id) 615 generated by the ramp-controlled current source 605 can begin at a substantially large current level and ramps down to a relatively low current level by the time K2 is turned off (e.g., opened). Operation of the RGC discharge block 625 with the ramp-generated discharge current is shown in the waveforms of FIG. 6B by thicker solid lines. For the sake of comparison, thinner dashed lines are used to show corresponding operation in context of a constant-current source. As illustrated, the behavior of Vp 610 is similar for both a constant discharge current and a ramp-generated discharge current.

However, the Vin 210 behavior is appreciably different. Vin 210 always equals the difference between Vp 610 and the voltage drop across Rp 207 (i.e., Id 615): $Vin=Vp-(Rp^*Id)$. When the discharge current (Id 615, dashed line) is constant, Vin 210 can be very small by the end of the second phase 302b because the constant Id 615 remains relatively large. In contrast, when the discharge current is ramped (Id 615, solid line), Vin 210 tends to drop relatively quickly at the start of the second phase 302b when Id 615 is much larger, then Vin 210 gets very close to Vp 610 toward the end of second phase 302b when Id 615 is relatively small. In the end, the minimum Vin during the second phase 302b is higher with the proposed scheme. This can help maintain a sufficiently large Vin 210 to reduce noise contributions from the ramp-controlled current source 605.

Figure 7A:
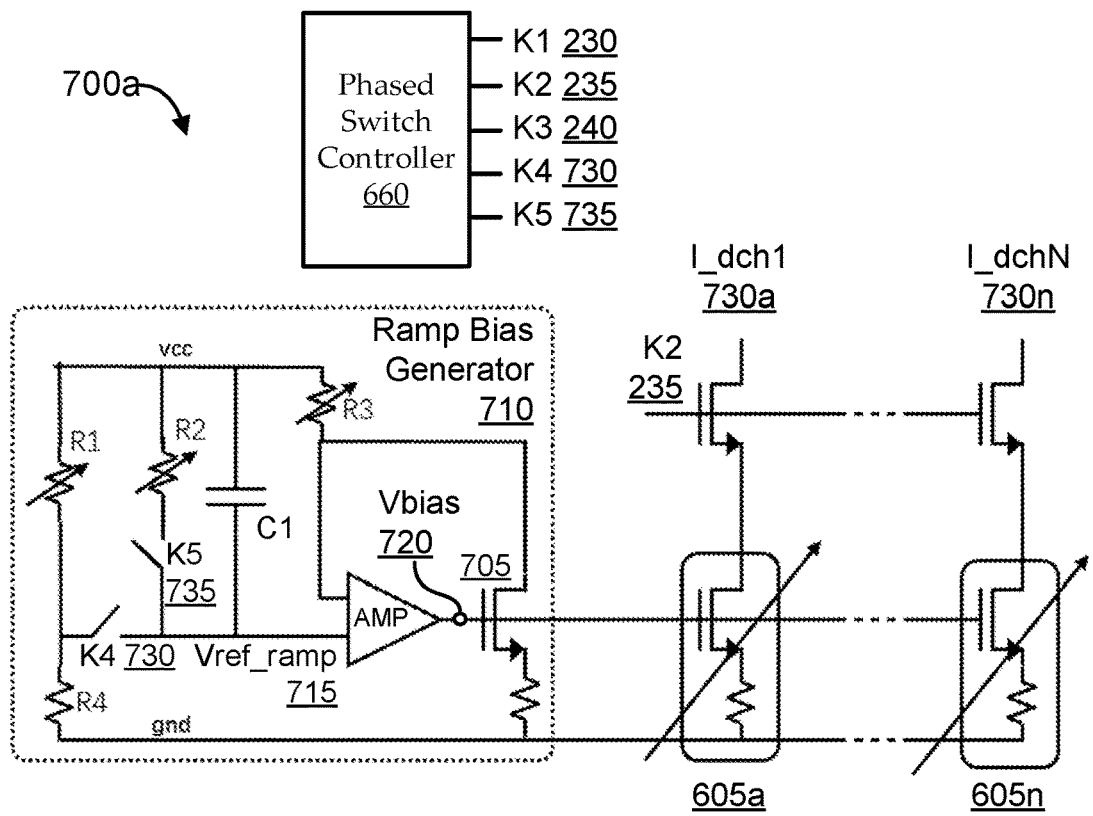
FIG. 7A shows an illustrative circuit implementation of an RGC discharge block, including a ramp bias generator biasing multiple instances of the ramp-controlled current source of FIG. 6.
Figure 7B:
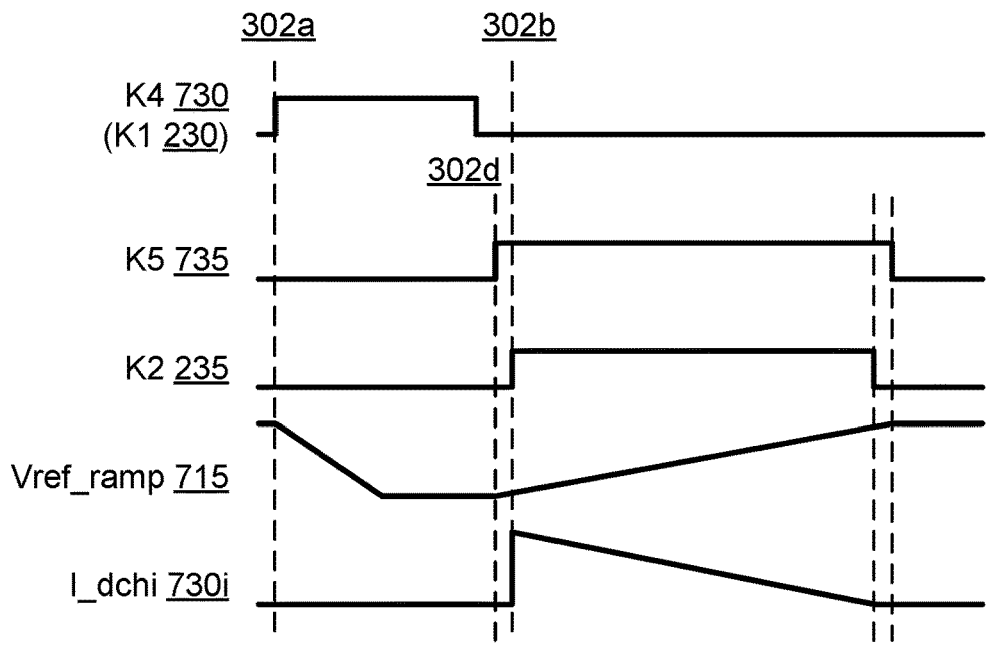
FIG. 7B shows multiple waveforms and timing for the RGC discharge block of FIG. 7A to illustrate operation of the RGC discharge block over multiple phases.

FIG. 7A shows an illustrative circuit implementation of an RGC discharge block 625, including a ramp bias generator 710 biasing multiple instances of the ramp-controlled current source 605 of FIG. 6A. FIG. 7B shows multiple waveforms and timing for the RGC discharge block 625 of FIG. 7A to illustrate operation of the RGC discharge block 625 over multiple phases 302. The ramp bias generator 710 can be an implementation of the ramp bias generator 607 of FIG. 6A. The ramp bias generator 710 includes a network of a capacitor (C1) and four resistors, an amplifier (AMP), and a master ramp-controlled current source 705. In the first phase 302a (e.g., which can be the same first phase 302a used to charge the capacitive input 201), a switch K4 730 is turned on (e.g., closed) to couple C1 between Vcc and a voltage ramp reference node (Vref_ramp) 715. In some embodiments, switch K4 has substantially the same timing as switch K1 230. The voltage at Vref_ramp 715 is some fraction of Vcc controlled by a voltage divider of resistors R1 and R4 (coupled between Vcc and ground). After charging C1, the voltage across C1 is the difference between Vcc and Vref_ramp 715.

At the second phase 302b, C1 is discharged to generate the ramp bias voltage. In some embodiments, as illustrated, the discharge of C1 begins at a fourth phase 302d. Fourth phase 302d can begin concurrent with or slightly before second phase 302b, and can end concurrent with or slightly after second phase 302b. At fourth phase 302d, a switch K5 735 in the ramp bias generator 710 is turned on, coupling C1 to R2 in parallel, so that C1 is discharged through R2. As illustrated in FIG. 7B, this causes Vref_ramp 715 to climb in a substantially linear fashion to Vcc. Another resistor (R3) and the amplifier are configured so that the current profile of C1 is reflected by the current profile through R3, thereby causing the output voltage of the amplifier (Vbias 720) to bias the master ramp-controlled current source 705 to generate a ramp-generated discharge current that is proportional to the current discharging from C1.

The Vbias 720 generated at the output of the amplifier (and of the ramp bias generator 710) can be used to bias one or more slave instances of the ramp-controlled current source 605. As such, each ramp-controlled current source 605 (labeled as 605a-605n in FIG. 7A) mirrors the ramp-generated discharge current produced by the ramp bias generator 710. As described with reference to FIGS. 6A and 6B, at the start of the second phase 302b, a switch corresponding to K2 235 is turned on to effectively activate the slave instances of the ramp-controlled current source 605 of the RGC discharge block 625 with Vbias 720 providing the ramp-generated discharge current. For example, as illustrated in FIG. 7A, a transistor is coupled with each ramp-controlled current source 605, and the transistor is turned on by K2 235. FIG. 7B shows that in each second phase 302b, using Vbias 720 to bias each ramp-controlled current source 605 causes each ith ramp-controlled current source 605 to produce a ramp-generated discharge current following curve I_dchi 730i (corresponding to any ith one of ramp-generated discharge currents I_dch1 730a-I_dchN 730n).

In some embodiments, all of the slave instances of the ramp-controlled current source 605 are nominally identical (i.e., designed and/or configured to operate in an identical manner, although they may actually operate in slightly different manners due, for example, to process variations). In other embodiments, different slave instances of the ramp-controlled current source 605 are configured to operate differently to accommodate differences in self-capacitors 105 being sensed. For example, a particular ramp-controlled current source 605 can be configured to generate a scaled-up or scaled-down version of the ramp-generated discharge current in response to the same Vbias 720, such as to discharge a larger or smaller self-capacitor 105 in the same T 305. In some such embodiments, the different slave instances of the ramp-controlled current source 605 are hard-configured to generate a desired scalar version of the ramp-generated discharge current. In other such embodiments, as illustrated in FIG. 7A, the different slave instances of the ramp-controlled current source 605 are variable current sources that can be adjusted to generate a desired scalar version of the ramp-generated discharge current.

Each ramp bias generator 710 generates the Vbias 720 for M ramp-controlled current sources 605. In some embodiments, the entire touch panel includes N self-capacitors 105, and a single ramp bias generator 710 is used to generate the Vbias 720 for all N ramp-controlled current sources 605 associated with all N self-capacitors 105 in the touch panel (i.e., M=N). In other embodiments, the entire touch panel includes N self-capacitors 105, and each of multiple ramp bias generators 710 is used to generate a respective Vbias 720 for a respective subset of M of the N ramp-controlled current sources 605 associated with the N self-capacitors 105 in the touch panel (i.e., 1<M<N). In some such embodiments, M is the same for all ramp bias generators 710 (i.e., if there are K ramp bias generators 710, then M=N/K). In other such embodiments, at least one of the ramp bias generators 710 has a different M than that of at least one other ramp bias generator 710. In other embodiments, the entire touch panel includes N self-capacitors 105, and each of multiple ramp bias generators 710 is used to generate a respective Vbias 720 for a respective one of the N ramp-controlled current sources 605 associated with the N self-capacitors 105 in the touch panel (i.e., M=1).

As noted with reference to FIG. 6A, embodiments can include a phased switch controller 660. The phased switch controller 660 can generate some or all of the signals for controlling K1 230, K2 235, K3 240, K4 730, and K5 735. In some embodiments, the phased switch controller 660 all of those control signals. In other embodiments, the phased switch controller 660 only generates some of the control signals, which are then used to generate the other control signals. For example, the signal to control K2 235 can be generated directly by the phased switch controller 660; or the phased switch controller 660 can generate the signal to control K5 735, which can be delayed (e.g., by delay logic, a counter, etc.) to generate the signal to control K 235.

Figure 8:
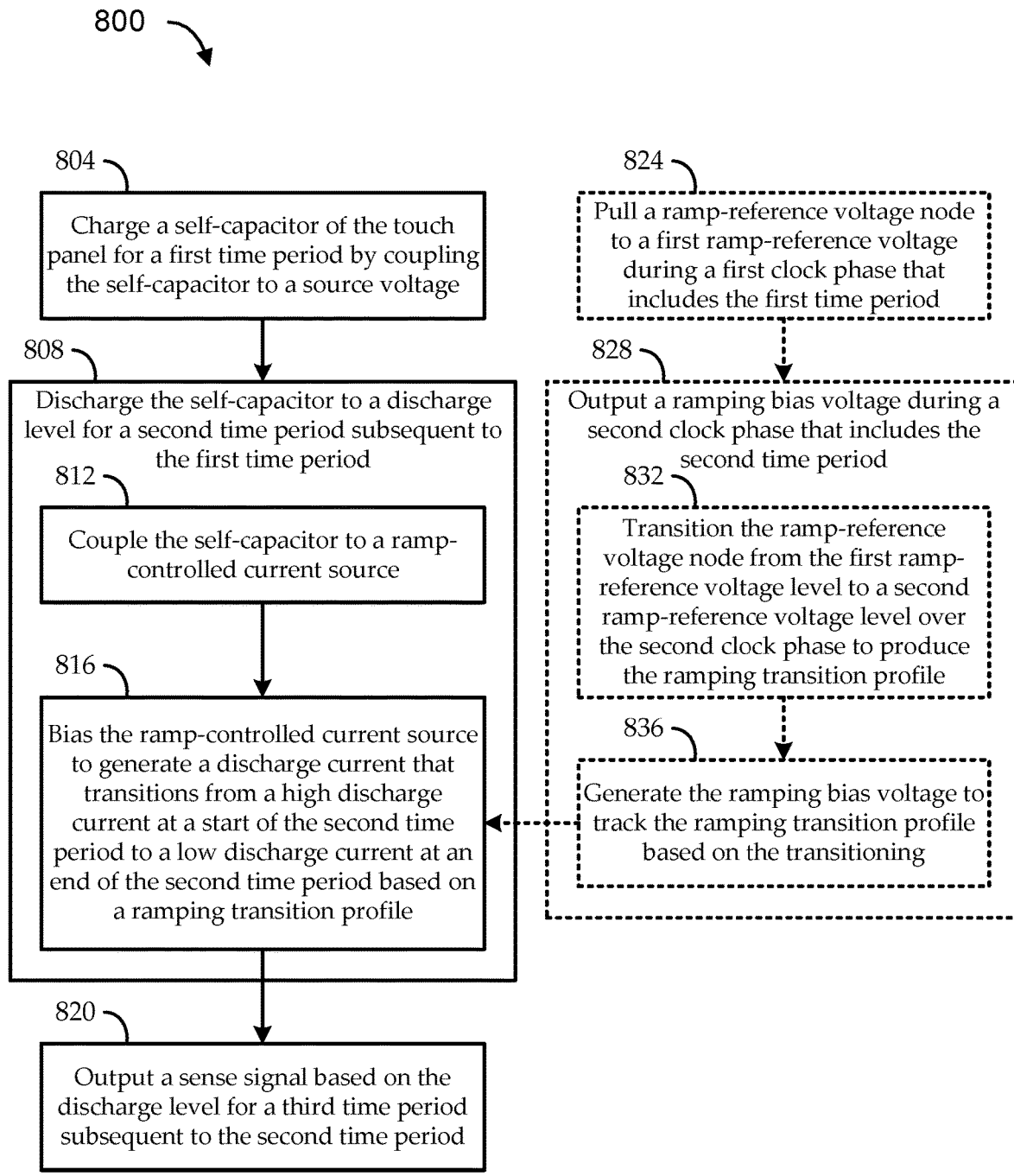
FIG. 8 shows a flow diagram of an illustrative method for self-capacitor sensing in a touch panel, according to embodiments described herein.

FIG. 8 shows a flow diagram of an illustrative method 800 for self-capacitor sensing in a touch panel, according to embodiments described herein. Embodiments of the method 800 can begin at stage 804 by charging a self-capacitor of the touch panel for a first time period. The charging can involve coupling the self-capacitor to a source voltage. As described herein, the self-capacitor has a first capacitance (e.g., a base capacitance, Cs) in absence of a local touch event on the touch panel and has a second capacitance (e.g., the base capacitance plus an additional induced capacitance, Cs+Ctouch) in presence of the local touch event on the touch panel. The second capacitance is measurably different from the first capacitance.

At stage 808, embodiments can discharge the self-capacitor to a discharge level for a second time period subsequent to the first time period (i.e., the discharge time and other parameters are controlled so that, at the end of the second time period, the self-capacitor has been discharged to an extent that only "discharge level" of current remains, as described herein). Stage 808 can be performed according to stages 812 and 816. At stage 812, embodiments can couple the self-capacitor to a ramp-controlled current source. At stage 816, embodiments can bias the ramp-controlled current source to generate a discharge current that transitions from a high discharge current at a start of the second time period to a low discharge current at an end of the second time period based on a ramping transition profile. Accordingly, the discharge level represents a predetermined first amount of remaining charge in absence of the local touch event (e.g., corresponding to Vcm) and a second (i.e., different) amount of remaining charge in presence of the local touch event (e.g., corresponding to Vcm—Vsense).

At stage 820, embodiments can output a sense signal based on the discharge level for a third time period subsequent to the second time period. In some embodiments, the self-capacitor is coupled with an input voltage node via an input resistor. In such embodiments, the charging at stage 804 can include coupling the input voltage node to the source voltage (e.g., Vcc) until the input voltage node is at the source voltage; the discharging at stage 808 can include decoupling the input voltage node from the source voltage and coupling the input voltage node to the ramp-controlled current source; and the outputting at stage 820 can include generating the sense signal based on a voltage level of the input voltage node. For example, the discharging at stage 808 can be such that, at an end of the second time period, the input voltage node is at a common-mode voltage level in absence of the local touch event on the touch panel, and the input voltage node is not at the common-mode voltage level in presence of the local touch event on the touch panel; and the outputting at stage 820 can include generating the sense signal by amplifying a voltage difference between the input voltage node and the common-mode voltage level.

In some embodiments, the method 800 further includes some or all of stages 824-836. At stage 824, embodiments can pull a ramp-reference voltage node to a first ramp-reference voltage during a first clock phase that includes the first time period (i.e., the beginning and end of the first time period are concurrent with, or within, the beginning and end of the first clock phase, respectively). For example, as described with reference to FIGS. 7A and 7B, in a first phase 302*a*, ramp-reference voltage node Vref_ramp 715 is pulled to a first ramp-reference voltage level set by a voltage divider between Vcc and ground. At stage 828, embodiments can output a ramping bias voltage (e.g., Vbias 720) during a second clock phase that includes the second time period (i.e., the beginning and end of the second time period are concurrent with, or within, the beginning and end of the second clock phase, respectively). Embodiments of stage 828 can include, at stage 832, transitioning the ramp-reference voltage node from the first ramp-reference voltage level to a second ramp-reference voltage level over the second clock phase to produce the ramping transition profile; and, at stage 836, generating the ramping bias voltage to track the ramping transition profile based on the transitioning. For example, as described with reference to FIGS. 7A and 7B, in a second phase 302*b* (or fourth phase 302*d*), ramp-reference voltage node Vref_ramp 715 is pulled to a second ramp-reference voltage level corresponding to Vcc. The result described with reference to FIGS. 7A and 7B is a ramping transition profile that causes the ramping bias voltage transition from a higher voltage to a lower voltage in a substantially linear fashion. In such embodiments, the ramp-controlled current source is coupled with and biased by the ramping bias voltage (i.e., the biasing at stage 816 is based on the ramping bias voltage generated in stage 836). In some such embodiments, the transitioning at stage 832 includes coupling the ramp reference voltage node to the second ramp-reference voltage level via a parallel resistor-capacitor network to pull the ramp-reference voltage node from the first ramp-reference voltage level to the second ramp-reference voltage level over the second clock phase in accordance with the ramping transition profile; and the generating at stage 836 includes generating the ramping bias voltage by a ramp bias amplifier responsive to feedback control based on comparing the ramp reference voltage node and a feedback node, the feedback node indicating an amount of current flowing through a master current source being biased by the ramping bias voltage, such that the ramping bias voltage is generated so that the amount of current flowing through the master current source tracks the ramping transition profile.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A system for self-capacitor sensing in a touch panel, the system comprising:
   a touch panel interface to couple with a self-capacitor of a touch panel, the self-capacitor having a first capacitance in absence of a local touch event on the touch panel and having a second capacitance in presence of the local touch event on the touch panel, the second capacitance being different from the first capacitance;
   a ramp-controlled current source;
   an amplifier block; and
   a phased switch controller coupled with a plurality of switches to:
      control a first one or more switches, for a first time period, to charge the self-capacitor based on a source voltage;
      control a second one or more switches, for a second time period subsequent to the first time period, to discharge the self-capacitor to a discharge level by biasing a ramp-controlled current source to generate a discharge current that transitions from a high discharge current at a start of the second time period to a low discharge current at an end of the second time period based on a ramping transition profile,
      such that the discharge level represents a first amount of remaining charge in absence of the local touch event and a second amount of remaining charge in presence of the local touch event, the first and second amounts of remaining charge being different.

2. The system of claim 1, further comprising:
   an amplifier block,
   wherein the phased switch controller is further configured to control a third one or more switches, for a third time period subsequent to the second time period, to output a sense signal based on the discharge level.

3. The system of claim 2, wherein:
   the phased switch controller controls the second one or more switches, for the second time period, to discharge the self-capacitor by coupling the self-capacitor with the ramp-controlled current source via an input voltage node until the input voltage node is at an input voltage level corresponding to the discharge level, such that the input voltage level corresponds to a reference voltage level in absence of the local touch event on the touch panel, and such that the input voltage level is different from the reference voltage level in presence of the local touch event on the touch panel; and
   the phased switch controller controls the third one or more switches, for the third time period, to output the sense signal by amplifying a difference between the input voltage level and the reference voltage level.

4. The system of claim 3, wherein the reference voltage level is a common-mode voltage level.

5. The system of claim 1, wherein:
   the touch panel interface couples an input voltage node with the self-capacitor via a resistor;
   the phased switch controller controls the first one or more switches, for the first time period, to couple the input voltage node with the source voltage to charge the self-capacitor; and
   the phased switch controller controls the second one or more switches, for the second time period, to discharge the self-capacitor further by coupling the input voltage node with the ramp-controlled current source.

6. The system of claim 1, further comprising:
   a ramp-generated current (RGC) discharge block comprising the ramp-controlled current source coupled with a ramp bias generator to generate a ramping bias voltage by which to bias the ramp-controlled current source.

7. The system of claim 3, wherein:
   the ramp bias generator comprises:
      a master current source; and
      a ramp bias amplifier configured to output the ramping bias voltage responsive to a ramp-reference voltage node and a feedback node, the feedback node indicating an amount of current flowing through the master current source as biased by the ramping bias voltage; and
   the phased switch controller is coupled with the plurality of switches further to:
      control a fourth one or more switches, during a first clock phase that includes the first time period, to pull the ramp-reference voltage node to a first ramp-reference voltage level; and
      control a fifth one or more switches, during a second clock phase that includes the second time period, to output the ramping bias voltage by transitioning the ramp-reference voltage node from the first ramp-reference voltage level to a second ramp-reference voltage level over the second clock phase to produce the ramping transition profile, the transitioning driving the ramp bias amplifier to generate the ramping bias voltage to track the ramping transition profile.

8. The system of claim 6, wherein:
   the ramp bias generator further comprises:
      an adjustable voltage divider network to set the first ramp-reference voltage level; and
      a resistor-capacitor network;
   the phased switch controls the fourth one or more switches, during the first clock phase, to couple the ramp-reference voltage node with the adjustable voltage divider network to pull the ramp-reference voltage node to the first ramp-reference voltage level; and
   the phased switch controls the fifth one or more switches, during the second clock phase, to output the ramping bias voltage by decoupling the ramp-reference voltage node from the adjustable voltage divider network and coupling the ramp-reference voltage node with the resistor-capacitor network to transition the ramp-reference voltage node to produce the ramping transition profile.

9. The system of claim 6, wherein the RGC discharge block comprises a plurality of instances of the ramp-controlled current source, each to couple with the ramp bias generator and with a respective one of a plurality of self-capacitors of the touch panel, and each to generate a respective instance of the discharge current responsive to biasing by the ramping bias voltage.

10. The system of claim 9, wherein at least one of the plurality of instances of the ramp-controlled current source is to generate the respective instance of the discharge current based on an adjustable current scaling factor.

11. The system of claim 6, wherein the RGC discharge block comprises:
N instances of the ramp-controlled current source each to discharge a respective one of N self-capacitors of the touch panel; and
K instances of the ramp bias generator, each to output a respective instance of the ramping bias voltage and to couple with a respective disjoint subset of the N instances of the ramp-controlled current source, wherein K and N are positive integers greater than 1, such that each instance of the ramp-controlled current source generates a respective instance of the discharge current responsive to biasing by the respective instance of the ramping bias voltage generated by the ramp bias generator with which it is coupled.

12. The system of claim 11, wherein each of the K instances of the ramp bias generator is coupled with a respective disjoint subset of N/K of the instances of the ramp-controlled current source.

13. The system of claim 1, wherein:
the ramping transition profile has a substantially constant negative slope, such that the discharge current is generated to transition substantially linearly a high discharge current at a start of the second time period to a low discharge current at an end of the second time period.

14. A display system comprising:
a display;
the touch panel integrated with the display and comprising a plurality of touch sense channels formed by a grid of row lines and column lines, each of the plurality of touch sense channels coupled with a respective one of a plurality of self-capacitors; and
a plurality of instances of the system for self-capacitor sensing of claim 1, each coupled with a respective one of the plurality of self-capacitors.

15. A method for self-capacitor sensing in a touch panel, the method comprising:
charging a self-capacitor of the touch panel for a first time period by coupling the self-capacitor to a source voltage, the self-capacitor having a first capacitance in absence of a local touch event on the touch panel and having a second capacitance in presence of the local touch event on the touch panel, the second capacitance being different from the first capacitance; and
discharging the self-capacitor to a discharge level for a second time period subsequent to the first time period by:
coupling the self-capacitor to a ramp-controlled current source; and
biasing the ramp-controlled current source to generate a discharge current that transitions from a high discharge current at a start of the second time period to a low discharge current at an end of the second time period based on a ramping transition profile, such that the discharge level represents a first amount of remaining charge in absence of the local touch event and a second amount of remaining charge in presence of the local touch event, the first and second amounts of remaining charge being different; and
outputting a sense signal based on the discharge level for a third time period subsequent to the second time period.

16. The method of claim 15, wherein:
the self-capacitor is coupled with an input voltage node via an input resistor;
the charging the self-capacitor comprises coupling the self-capacitor to the source voltage by coupling the input voltage node to the source voltage until the input voltage node is at the source voltage;
the discharging the self-capacitor comprises decoupling the input voltage node from the source voltage and coupling the input voltage node to the ramp-controlled current source; and
the outputting comprises generating the sense signal based on a voltage level of the input voltage node.

17. The method of claim 16, wherein:
the discharging the self-capacitor is such that, at an end of the second time period, the input voltage node is at a common-mode voltage level in absence of the local touch event on the touch panel, and the input voltage node is not at the common-mode voltage level in presence of the local touch event on the touch panel; and
the outputting comprises generating the sense signal by amplifying a voltage difference between the input voltage node and the common-mode voltage level.

18. The method of claim 15, further comprising:
pulling a ramp-reference voltage node to a first ramp-reference voltage during a first clock phase that includes the first time period; and
outputting a ramping bias voltage during a second clock phase that includes the second time period by:
transitioning the ramp-reference voltage node from the first ramp-reference voltage level to a second ramp-reference voltage level over the second clock phase to produce the ramping transition profile; and
generating the ramping bias voltage to track the ramping transition profile based on the transitioning,
wherein the ramp-controlled current source is coupled with and biased by the ramping bias voltage.

19. The method of claim 18, wherein:
the transitioning comprises coupling the ramp reference voltage node to the second ramp-reference voltage level via a parallel resistor-capacitor network to pull the ramp-reference voltage node from the first ramp-reference voltage level to the second ramp-reference voltage level over the second clock phase in accordance with the ramping transition profile; and
the generating the ramping bias voltage comprises generating the ramping bias voltage by a ramp bias amplifier responsive to feedback control based on comparing the ramp reference voltage node and a feedback node, the feedback node indicating an amount of current flowing through a master current source being biased by the ramping bias voltage, such that the ramping bias voltage is generated so that the amount of current flowing through the master current source tracks the ramping transition profile.

* * * * *